United States Patent
Hisada et al.

(10) Patent No.: US 9,957,193 B2
(45) Date of Patent: May 1, 2018

(54) SINGLE GLASS PANEL FOR FIRE DOOR AND DOUBLE GLAZED GLASS PANEL FOR FIRE DOOR

(71) Applicant: Nippon Sheet Glass Company, Limited, Tokyo (JP)

(72) Inventors: Takashi Hisada, Tokyo (JP); Kazuyuki Suzuki, Tokyo (JP); Sachiko Nishikawa, Tokyo (JP); Takashi Yokota, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 413 days.

(21) Appl. No.: 14/355,358

(22) PCT Filed: Oct. 29, 2012

(86) PCT No.: PCT/JP2012/077899
§ 371 (c)(1),
(2) Date: Apr. 30, 2014

(87) PCT Pub. No.: WO2013/065641
PCT Pub. Date: May 10, 2013

(65) Prior Publication Data
US 2014/0248447 A1    Sep. 4, 2014

(30) Foreign Application Priority Data
Nov. 1, 2011  (JP) .................. 2011-240423

(51) Int. Cl.
*E06B 5/16* (2006.01)
*C03C 17/245* (2006.01)
(Continued)

(52) U.S. Cl.
CPC .......... *C03C 17/2453* (2013.01); *C03C 17/09* (2013.01); *C03C 27/06* (2013.01);
(Continued)

(58) Field of Classification Search
CPC ................ C03C 17/2453; C03C 17/09; C03C 2217/211; C03C 2217/263;
(Continued)

(56) References Cited

U.S. PATENT DOCUMENTS 4,048,978 A * 9/1977 Plumat .................... C03C 17/06
126/200
5,624,760 A   4/1997 Collins et al.
(Continued)

FOREIGN PATENT DOCUMENTS

CN       101500956 A      8/2009
JP       S48-101412 A     12/1973
(Continued)

OTHER PUBLICATIONS

Supplementary European Search Report of EP 12 84 5349.
(Continued)

*Primary Examiner* — Donald J Loney
(74) *Attorney, Agent, or Firm* — Muncy, Geissler, Olds & Lowe, P.C.

(57) ABSTRACT

A single glass panel for a fire door and a double glazed glass panel for a fire door that have a fireproofness with which the glass sheet passes an international standard ISO 0834 flame insulating performance test and are as inexpensive as possible. For example, the single glass panel for a fire door is obtained by forming a heat reflecting coating with a low emissivity on at least one surface of a glass sheet that is a heat strengthened glass sheet or is more thermally strengthened than a heat strengthened glass sheet, and the double glazed glass panel for a fire door includes a first glass sheet (2B) obtained by forming a heat reflecting coating (4) with an emissivity of 0.07 or less on at least one surface of a glass sheet that is a heat strengthened glass sheet or is more thermally strengthened than a heat strengthened glass sheet (Continued)

and a second glass sheet (2C) that is a heat strengthened glass sheet or is a glass sheet more thermally strengthened than a heat strengthened glass sheet, the first glass sheet (2B) and the second glass sheet (2C) being arranged to face each other with a gap therebetween such that at least one layer of said heat reflecting coating (4) is placed between the two glass sheets (2B) and (2C).

14 Claims, 2 Drawing Sheets

(51) Int. Cl.
*C03C 17/09* (2006.01)
*C03C 27/06* (2006.01)
*E06B 3/67* (2006.01)
*E06B 3/66* (2006.01)

(52) U.S. Cl.
CPC .. *C03C 2217/211* (2013.01); *C03C 2217/256* (2013.01); *C03C 2217/263* (2013.01); *C03C 2217/70* (2013.01); *E06B 3/66* (2013.01); *E06B 3/67* (2013.01); *E06B 3/6715* (2013.01); *E06B 5/165* (2013.01)

(58) Field of Classification Search
CPC ....... C03C 2217/70; E06B 5/165; E06B 3/66; E06B 3/67; E06B 3/6715
See application file for complete search history.

(56) References Cited

U.S. PATENT DOCUMENTS

| | | | |
|---|---|---|---|
| 6,558,494 | B1 | 5/2003 | Wang et al. |
| 7,087,309 | B2* | 8/2006 | Kriltz ................ B32B 17/10174 428/34 |
| 7,718,266 | B2* | 5/2010 | Kriltz ................ B32B 17/10045 428/34 |
| 2003/0157339 | A1 | 8/2003 | Sawada et al. |
| 2006/0201202 | A1* | 9/2006 | Nakajima ............... C03C 17/10 65/60.5 |
| 2009/0169846 | A1* | 7/2009 | Siddle ..................... C03C 17/36 428/216 |

FOREIGN PATENT DOCUMENTS

| | | |
|---|---|---|
| JP | 55-047232 A | 4/1980 |
| JP | 07-502478 A | 3/1995 |
| JP | 08-040747 A | 2/1996 |
| JP | 2000-109349 A | 4/2000 |
| JP | 2002-226237 A | 8/2002 |
| JP | 2003-306356 A | 10/2003 |
| JP | 2003-313053 A | 11/2003 |
| WO | 00/37383 A1 | 6/2000 |

OTHER PUBLICATIONS

International Preliminary Report on Patentability dated Feb. 5, 2013 in the corresponding international application No. PCT/JP2012/077899 (English translation only).
English Translation of International Preliminary Report on Patentability Chapter I (IB/373) and its notification of transmittal (IB/326) dated May 15, 2014.
Notice of Reasons for Rejection for Japanese Patent application No. 2013-541765 dated Jun. 7, 2016.
The office action of the CN patent application No. 201280053377.2 dated Jun. 23, 2016.

* cited by examiner

SINGLE GLASS PANEL FOR FIRE DOOR AND DOUBLE GLAZED GLASS PANEL FOR FIRE DOOR

This application is a national stage of International Application No.: PCT/JP2012/077899, which was filed on Oct. 29, 2012, and which claims priority to JP2011-240423 which was filed on Nov. 1, 2011, and which are both herein incorporated by reference.

TECHNICAL FIELD

The present invention relates to a single glass panel for a fire door and a double glazed glass panel for a fire door that are used with a holding frame or the like such as a window.

BACKGROUND ART

Patent Document 1, shown below as a prior art document related to this type of a single glass panel for a fire door or a double glazed glass panel for a fire door, proposes, as a glass panel for a fire door, a glass panel obtained by forming a heat reflecting coating (Low-E coating) on at least one surface of a fireproof glass sheet such as a low expansion glass sheet, wired glass sheet and transparent crystallized glass sheet, and a double glazed glass panel obtained by combining this fireproof glass sheet and a standard glass sheet, which is not a fireproof glass sheet. Patent Document 1 states that the heat reflecting coating is used only for the purpose of restricting the conduction of radiant heat given off by a fire and preventing the temperature in rooms where a fire has not broken out from increasing while maintaining the transparency of the glass sheet.

Substantially similarly to Patent Document 1, Patent Document 2, shown below as another prior art document, also proposes, as a glass panel for a fire door, a single fireproof glass sheet in which a heat reflecting coating and an antioxidation coating are formed on at least one surface thereof, and a double glazed glass panel obtained by combining this fireproof glass sheet and another fireproof glass sheet. This document also states that the heat reflecting coating is used only for preventing a fire from spreading to adjacent rooms due to a heat insulating effect while maintaining the transparency of the glass sheet even when the fire breaks out.

CITATION LIST

Patent Literature

Patent Document 1: JP H8-40747A (paragraph [0011], FIG. 1, FIG. 3 and the like)
Patent Document 2: JP 2003-313053A (paragraph [0059], FIG. 1, FIG. 4 and the like)

SUMMARY OF INVENTION

Technical Problem

However, the glass panel for a fire door described in Patent Document 1 and Patent Document 2 always uses at least one fireproof glass sheet (e.g., a low expansion glass sheet, wired glass sheet and transparent crystallized glass sheet), and therefore, the single glass panel for a fire door or the double glazed glass panel for a fire door capable of achieving an inexpensive fire door that can be considered to be a sufficiently marketable type is not provided.

Therefore, the present invention was made in view of the problems of the conventional techniques described above as examples, and it is an object thereof to provide a single glass panel for a fire door and a double glazed glass panel for a fire door that have enough fireproofness to pass the international standard ISO 0834 flame insulating performance test (Fire resistance tests—Elements of building construction) (hereinafter, referred to as an "ISO 0834 flame insulating performance test") and can achieve as inexpensive a fire door as possible.

Solution to Problem

In an aspect of the present invention, the single glass panel for a fire door is obtained by forming a heat reflecting coating with a low emissivity on at least one surface of a glass sheet that is a heat strengthened glass sheet or is more thermally strengthened than a heat strengthened glass sheet.

It has been confirmed that even if an inexpensive heat strengthened glass sheet prescribed in JIS R 3222 or a relatively inexpensive glass sheet such as a tempered glass sheet prescribed in JIS R 3206 is used, by forming a heat reflecting coating with a low emissivity on at least one surface of the glass sheet, the single glass panel for a fire door according to the above-described aspect of the present invention can pass at least the ISO 0834 flame insulating performance test in which a flame is positioned on the side of the heat reflecting coating (coating side heating). Most of heat rays emitted from the flame or the like that is positioned on the side of the heat reflecting coating of the glass sheet are reflected back to the side of the flame by the heat reflecting coating. Thereby, an increase in the temperature of the central portion of the glass sheet is restricted and a large difference in temperature between the central portion of the glass sheet and its peripheral portion is not generated. As a result, it is understood that the strain within the glass sheet based on the difference in temperature does not exceed the surface compressive stress of 20 to 100 MPa of a heat strengthened glass or a tempered glass, and therefore, the single glass panel for a fire door can pass the ISO 0834 flame insulating performance test. Accordingly, a single glass panel for a fire door capable of achieving an inexpensive fire door compared to a conventional fire door can be obtained.

In the single glass panel for a fire door according to another aspect of the present invention, a coating with an emissivity of 0.15 or less is used as the heat reflecting coating.

It has been confirmed that, as in this configuration, even if a glass sheet such as a tempered glass or a super tempered glass in which a surface stress can be relatively easily achieved is used, the single glass panel for a fire door can pass the flame insulating performance test by using a heat reflecting coating with an emissivity of 0.15 or less (coating side heating).

In the single glass panel for a fire door according to another aspect of the present invention, a coating with an emissivity of 0.1 or less is used as the heat reflecting coating.

With this configuration, reflection efficiency is further increased compared to a case where the heat reflecting coating with an emissivity of 0.15 is used. Therefore, even if a glass sheet with a relatively low surface compressive stress is used, this configuration is favorable because a possibility that the single glass panel for a fire door can pass the ISO 0834 flame insulating performance test is increased and the cost is further reduced.

In the single glass panel for a fire door according to another aspect of the present invention, a coating with an emissivity of 0.07 or less is used as the heat reflecting coating.

With this configuration, reflection efficiency is further increased compared to a case where a heat reflecting coating with an emissivity of 0.1 is used. Therefore, even if a glass sheet with a relatively low surface compressive stress is used, this configuration is favorable because a possibility that the single glass panel for a fire door can pass the flame insulating performance test of ISO 0834 is increased and the cost is still more reduced.

In the single glass panel for a fire door according to another aspect of the present invention, a heat strengthened glass sheet with a surface compressive stress of 20-60 MPa is used as the glass sheet.

With this configuration, even when the glass sheet absorbs heat to some extent regardless of the heat reflecting coating, the single glass panel for a fire door has a sufficient crack resistant performance by being strengthened equally to a heat strengthened glass.

In an aspect of the present invention, the double glazed glass panel for a fire door includes a first glass sheet obtained by forming a heat reflecting coating with an emissivity of 0.07 or less on at least one surface of a glass sheet that is a heat strengthened glass sheet or is more thermally strengthened than a heat strengthened glass sheet and a second glass sheet that is a heat strengthened glass sheet or a glass sheet more thermally strengthened than a heat strengthened glass sheet, the first glass sheet and the second glass sheet being arranged to face each other with a gap therebetween such that at least one layer of said heat reflecting coating is placed between the two glass sheets.

It has been confirmed that with the double glazed glass panel for a fire door according to the above-described aspect of the present invention, even if a double glazed glass panel for a fire door including two glass sheets thermally strengthened equally to a heat strengthened glass is used, by forming a heat reflecting coating with an emissivity of 0.07 or less on the inner surface of one glass sheet, the double glazed glass panel for a fire door can pass the ISO 0834 flame insulating performance test in at least one case of the case where a flame is positioned on the side of the first glass sheet and the case where a flame is positioned on the side of the second glass sheet (fire prevention on one surface). As a result, a double glazed glass panel for a fire door capable of achieving an inexpensive fire door compared to a conventional fire door can be obtained.

Moreover, in this configuration, at least one heat reflecting coating is placed between the two glass sheets. Therefore, even if, for example, a heat reflecting coating formed of silver, which has a particularly low emissivity, is used, this configuration is favorable because deterioration of the coating by oxidation is suppressed.

In the double glazed glass panel for a fire door according to another aspect of the present invention, the second glass sheet is constituted by a super tempered glass sheet or a glass sheet that is more thermally strengthened than a super tempered glass sheet.

It has been confirmed that, as in this configuration, by using a glass sheet thermally strengthened more than or equally to a super tempered glass as the second glass sheet, the double glazed glass panel for a fire door can pass the ISO 0834 flame insulating performance test in both the case where a flame is positioned on the side of the first glass sheet and the case where a flame is positioned on the side of the second glass sheet (fire prevention on both surfaces).

In another aspect of the present invention, the double glazed glass panel for a fire door includes a first glass sheet obtained by forming a heat reflecting coating with an emissivity of 0.1 or less on at least one surface of a glass sheet that is a heat strengthened glass sheet or is more thermally strengthened than a heat strengthened glass sheet and a second glass sheet that is a glass sheet more thermally strengthened than a super tempered glass sheet, the first glass sheet and the second glass sheet being arranged to face each other with a gap therebetween such that at least one layer of said heat reflecting coating is placed between the two glass sheets.

It has been confirmed that with the double glazed glass panel for a fire door according to the above-described aspect of the present invention, even if a double glazed glass panel for a fire door including the first glass sheet obtained by forming the heat reflecting coating with an emissivity of 0.1 or less on at least one surface of the glass sheet thermally strengthened more than or equally to a heat strengthened glass sheet is used, by using a glass sheet thermally strengthened more than or equally to a super tempered glass as the second glass sheet, the double glazed glass panel for a fire door can pass the ISO 0834 flame insulating performance test in both the case where a flame is positioned on the side of the first glass sheet and the case where a flame is positioned on the side of the second glass sheet (fire prevention on both surfaces). As a result, a double glazed glass panel for a fire door capable of achieving an inexpensive fire door compared to a conventional fire door can be obtained.

Moreover, in this configuration, at least one heat reflecting coating is placed between the two glass sheets. Therefore, even if, for example, a heat reflecting coating formed of silver, which has a particularly low emissivity, is used, this configuration is favorable because deterioration of the coating by oxidation is suppressed.

In another aspect of the present invention, the double glazed glass panel for a fire door is a first glass sheet obtained by forming a heat reflecting coating with an emissivity of 0.15 or less on at least one surface of a glass sheet that is a tempered glass sheet or is more thermally strengthened than a tempered glass sheet and a second glass sheet that is an arbitrary glass sheet including a non-tempered glass sheet, the first glass sheet and the second glass sheet being arranged to face each other with a gap therebetween such that at least one layer of said reflecting coating is placed between the two glass sheets.

It has been confirmed that with the double glazed glass panel for a fire door according to the above-described aspect of the present invention, even if a double glazed glass panel for a fire door including the second glass sheet that is a non-tempered glass sheet (FL) is used, by using a glass sheet obtained by forming the heat reflecting coating with an emissivity of 0.15 or less on at least one surface of the glass sheet thermally strengthened more than or equally to a tempered glass sheet as the first glass sheet, the double glazed glass panel for a fire door can pass the ISO 0834 flame insulating performance test in at least one case of the case where a flame is positioned on the side of the first glass sheet and the case where a flame is positioned on the side of the second glass sheet (fire prevention on one surface). As a result, a double glazed glass panel for a fire door capable of achieving an inexpensive fire door compared to a conventional fire door can be obtained.

In the double glazed glass panel for a fire door according to another aspect of the present invention, the heat reflecting coating formed on the first glass sheet has an emissivity of 0.07 or less.

It has been confirmed that, as in this configuration, by setting the emissivity of the heat reflecting coating to 0.07 or less, the double glazed glass panel for a fire door can pass the ISO 0834 flame insulating performance test in both the case where a flame is positioned on the side of the first glass sheet and the case where a flame is positioned on the side of the second glass sheet (fire prevention on both surfaces).

In another aspect of the present invention, the double glazed glass panel for a fire door includes a first glass sheet obtained by forming a first heat reflecting coating on at least one surface of a glass sheet that is a heat strengthened glass sheet or is more thermally strengthened than a heat strengthened glass sheet and a second glass sheet obtained by forming a second heat reflecting coating on at least one surface of a glass sheet that is a heat strengthened glass sheet or is more thermally strengthened than a heat strengthened glass sheet, the first glass sheet and the second glass sheet being arranged to face each other with a gap therebetween such that at least one layer of the first and the second heat reflecting coatings is placed between the two glass sheets, and an emissivity of one of the first and the second heat reflecting coatings is set to 0.07 or less and an emissivity of the other is set to 0.1 or less.

It has been confirmed that with the double glazed glass panel for a fire door according to the above-described aspect of the present invention, the first and the second glass sheets obtained by forming the heat reflecting coating on one surface of the glass sheet thermally strengthened more than or equally to a heat strengthened glass sheet are arranged to face each other with a gap therebetween such that the heat reflecting coatings are placed between the two glass sheets, and the emissivity of one of the first heat reflecting coating and the second heat reflecting coating is set to 0.07 or less and the emissivity of the other heat reflecting coating is set to 0.1 or less, so that the double glazed glass panel for a fire door can pass the ISO 0834 flame insulating performance test in at least one case of the case where a flame is positioned on the side of the first glass sheet and the case where a flame is positioned on the side of the second glass sheet (fire prevention on one surface). As a result, a double glazed glass panel for a fire door capable of achieving an inexpensive fire door compared to a conventional fire door can be obtained.

In the double glazed glass panel for a fire door according to another aspect of the present invention, an emissivity of one of the first and the second heat reflecting coatings is set to 0.07 or less and an emissivity of the other is set to 0.07 or less.

It has been confirmed that, as in this configuration, by setting the emissivity of the heat reflecting coating to 0.07 or less, the double glazed glass panel for a fire door can pass the ISO 0834 flame insulating performance test in both the case where a flame is positioned on the side of the first glass sheet and the case where a flame is positioned on the side of the second glass sheet (fire prevention on both surfaces).

It should be noted that a "non-tempered glass sheet" in this application refers to a glass sheet that is not thermally strengthened after being produced by manufacturers of glass sheets (its surface compressive stress is less than 20 MPa, but is not particularly defined) and other glass sheets, that is a heat strengthened glass sheet, tempered glass sheet, super tempered glass sheet, and heat resistant tempered glass sheet, are glass sheets that are caused to have a surface compressive stress in the following range by thermally strengthening the non-tempered glass to the individual level.

Heat strengthened glass sheet: a glass sheet with a surface compressive stress of 20 MPa or more and less than 80 MPa (hereinafter, abbreviated to 20-80 MPa).

Tempered glass sheet: a glass sheet with a surface compressive stress of 80 MPa or more and 100 MPa or less (hereinafter, abbreviated to 80-100 MPa).

Super tempered glass sheet: a glass sheet with a surface compressive stress of more than 100 MPa and less than 140 MPa (hereinafter, abbreviated to 100-140 MPa).

Heat resistant tempered glass sheet: a glass sheet with a surface compressive stress of 140 MPa or more.

DESCRIPTION OF EMBODIMENTS

Hereinafter, embodiments for implementing the present invention will be described with reference to the drawings.

EXAMPLE 1

<Example of Configuration of Single Glass Panel for Fire Door>

Figure 1:
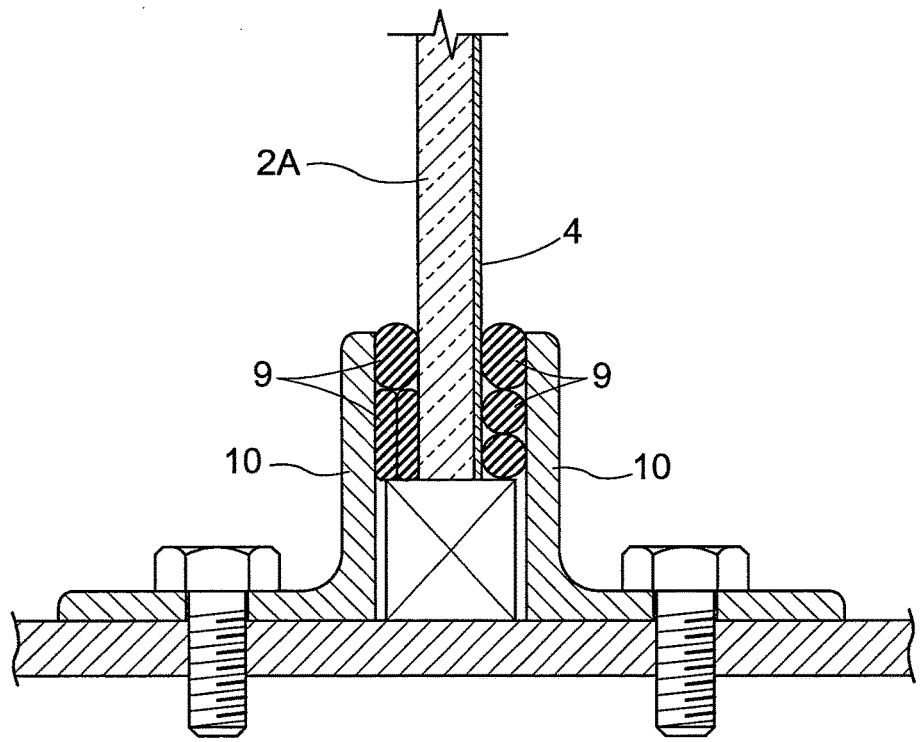
FIG. 1 is a cross-sectional view of an example of a single glass panel for a fire door according to the present invention.

FIG. 1 shows an example of the single glass panel for a fire door according to the present invention.

This single glass panel for a fire door has a single glass sheet 2A with a thickness of 3 mm or more and a heat reflecting coating 4 formed on the whole of one surface of the glass sheet 2A, and is fitted and fixed to a sash frame 10 of a structure via beads 9.

The glass sheet 2A is a heat strengthened glass (surface compressive stress: 20-80 MPa) or a tempered glass (surface compressive stress: 80-100 MPa).

The heat reflecting coating 4 is a thin coating including a thin layer of silver, is formed by sputtering, and is made to have an emissivity (E) of 0.1 or less.

Although the single glass panel for a fire door is thermally strengthened after the reflecting coating is formed, on the contrary, the heat reflecting coating 4 may be formed after the single glass panel for a fire door is thermally strengthened. In particular, in the former case, the emissivity (E) of the heat reflecting coating 4 of 0.1 or less is the value after the single glass panel for a fire door is thermally strengthened.

It should be noted that an ordinary thin coating of tin oxide that has an emissivity of approximately 0.15 is also suitable for the heat reflecting coating 4 of the present invention, and a metal coating or a metal oxide coating with an emissivity (E) of 0.1 or less is more preferable.

TABLE 1

| | | Glass sheet 2A | | | | | |
|---|---|---|---|---|---|---|---|
| | | Surface compressive | Emissivity (E) | | | | |
| No. | Type of glass | stress (MPa) | 0.03 | 0.07 | 0.1 | 0.15 | 0.95 |
| 1-1 | FL | 0 | Poor | Poor | Poor | Poor | Poor |
| 1-2 | Heat | 20 | Good | Good | Poor | Poor | Poor |
| 1-3 | strengthened | 30 | Good | Good | Good | Poor | Poor |
| 1-4 | | 60 | Good | Good | Good | Poor | Poor |
| 1-5 | Tempered | 80 | Good | Good | Good | Good | Poor |
| 1-6 | | 100 | Good | Good | Good | Good | Poor |
| 1-7 | Super tempered | 120 | Good | Good | Good | Good | Poor |
| 1-8 | Heat resistant tempered | 140 | Good | Good | Good | Good | Good |

The above Table 1 shows the results of the ISO 0834 flame insulating performance test (fire prevention test) for various single glass sheets including the single glass panel for a fire door according to the present invention. A float glass sheet that was not thermally strengthened and a heat resistant tempered glass sheet, which were beyond the scope of the present invention, were subjected to the test as a reference glass sheet.

In this flame insulating performance test, all the glass sheet specimens had a rectangular plate shape of 900 mm×1,800 mm×4 mm based on JIS R 3204, and the specimens were positioned such that a flame used in the flame insulating performance test faced the surface of the glass sheet 2A on which the heat reflecting coating 4 was formed (coating side heating).

"Good" in the table shows that the single glass sheet passed the ISO 0834 flame insulating performance test, and "Poor" shows that the single glass sheet was broken by the heat during the test and did not pass the test.

In Table 1, the emissivity of 0.95 is the emissivity in the case where no heat reflecting coating was formed, the emissivity of 0.15 is the emissivity of the heat reflecting coating 4 formed of tin oxide ($SnO_2$) made by CVD, the emissivity of 0.1 is the emissivity of the heat reflecting coating 4 including a layer formed of silver made by sputtering, and the emissivities of 0.07 and 0.03 are the emissivities of the heat reflecting coatings 4 including two or more layers formed of silver made by sputtering.

Table 1 shows that, for example, the heat strengthened glass sheet with a surface compressive stress of 20 MPa passed the flame insulating performance test when the heat reflecting coating 4 with an emissivity of 0.07 was formed thereon, but did not pass the flame insulating performance test when the heat reflecting coating 4 with an emissivity of 0.1 was formed thereon. Moreover, Table 1 shows the results that the heat strengthened glass sheet on which the heat reflecting coating 4 with an emissivity of 0.1 was formed passed the flame insulating performance test when the heat strengthened glass had a surface compressive stress of 30 MPa, but did not pass the flame insulating performance test when the heat strengthened glass had a surface compressive stress of 20 MPa.

On the other hand, when the surface compressive stress was set to 80-120 MPa, which can be relatively easily achieved, the glass sheet 2A with an emissivity of 0.15, which is not so small, was able to pass the test.

That is, generally, the higher the surface compressive stress is and the lower the emissivity of the heat reflecting coating 4 is, the more easily the glass sheet 2A can pass the flame insulating performance test. It is clear that even if the surface compressive stress is not so high, the glass sheet 2A has a tendency to pass the flame insulating performance test when the emissivity of the heat reflecting coating 4 is low enough, and, in the same manner, even if the emissivity of the heat reflecting coating 4 is not so low, the glass sheet 2A has a tendency to pass the flame insulating performance test when the surface compressive stress is high enough.

It should be noted that the single glass sheet obtained by forming the heat reflecting coating 4 on the float glass sheet that was not thermally strengthened was found not to pass the ISO 0834 flame insulating performance test regardless of the emissivity of the heat reflecting coating 4. Accordingly, it was found that, only by forming the heat reflecting coating 4 on an arbitrary glass sheet, the obtained glass sheet cannot pass the flame insulating performance test and it is necessary to use the glass sheet that has a surface compressive stress of at least approximately 20 MPa.

Moreover, as shown in Table 1, although a single heat resistant tempered glass sheet (surface compressive stress: 140 MPa or more) can pass the ISO 0834 flame insulating performance test, even if the heat reflecting coating 4 is not formed thereon (that is, it can naturally pass the test if the heat reflecting coating 4 is formed thereon), the manufacturing cost of the heat resistant tempered glass sheet is high because a very high surface compressive stress is applied thereto, and therefore, the effect of reducing the cost is small compared to cases where the heat strengthened glass sheet, tempered glass sheet, or super tempered glass sheet described above is used.

It should be noted that in a case where the single glass panel for a fire door according to the present invention uses a thin coating made of silver as the heat reflecting coating 4, there is a problem that such a single glass sheet is not suitable for use as a fire door for a long period of time, even if the single glass sheet can pass the flame insulating performance test, because the emissivity of the heat reflecting coating 4 is increased by air oxidation. Therefore, when a glass panel for a fire door capable of being used for a long period of time is achieved by using a thin coating made of silver as the heat reflecting coating 4, it is necessary to use a double glazed glass panel in which the air oxidation of the thin coating made of silver is suppressed as shown in the following Example 2 and Example 3.

EXAMPLE 2

<First Example of Configuration of Double Glazed Glass Panel for a Fire Door>

Figure 2:
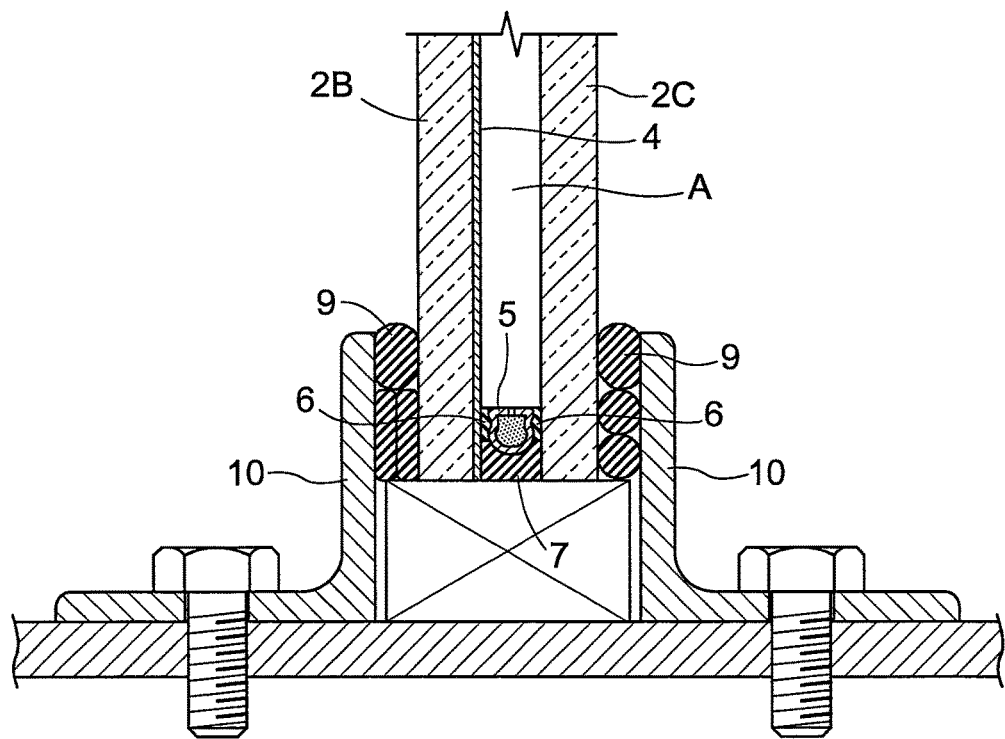
FIG. 2 is a cross-sectional view of an example of a double glazed glass panel for a fire door according to the present invention.

FIG. 2 shows an example of the double glazed glass panel for a fire door according to the present invention.

This double glazed glass panel for a fire door includes a single first glass sheet 2B and second glass sheet 2C both of which have a thickness of 3 mm or more and a spacer 5 made of aluminum for arranging the two glass sheets 2B and 2C to be separate from each other. A heat reflecting coating 4 is formed only on the whole of one surface, which faces the second glass sheet 2C, of the first glass sheet 2B. The double glazed glass panel for a fire door is fitted and fixed to a sash frame 10 of a structure via beads 9.

As shown in following Table 2, the first glass sheet 2B is a heat strengthened glass sheet with a surface compressive stress of 20-60 MPa or a tempered glass sheet with a surface compressive stress of 80-100 MPa.

The second glass sheet 2C is any one of a float glass sheet that is not thermally strengthened, a heat strengthened glass sheet with a surface compressive stress of 20-60 MPa, a tempered glass sheet with a surface compressive stress of 80-100 MPa, and a super tempered glass sheet with a surface compressive stress of 140 MPa or more.

The heat reflecting coating 4 is a thin coating made of silver that is formed by sputtering, and is formed inside the double glazed glass panel for a fire door, that is, on the surface of the first glass sheet 2B that faces the second glass sheet 3. The emissivity (E) of the heat reflecting coating 4 is appropriately selected from the range between 0.15 and 0.03 or more.

An air layer A with a thickness of approximately 6 mm or 12 mm is hermetically held between the first glass sheet 2B and the second glass sheet 3 that are arranged so as to be separate from each other by the spacer 5.

A first seal material 6 made of polyisobutylene is placed between the spacer 5 and the first glass sheet 2B and between the spacer 5 and the second glass sheet 2C, and a second seal material 7 made of polysulfide is placed between the first glass sheet 2B and the second glass sheet 2C outside the spacer 5.

prevention performance on both the surfaces was determined to be the most excellent combination.

Table 2 shows that when the first glass sheet 2B on which the heat reflecting coating is formed and the second glass sheet 2C on which no heat reflecting coating is formed are combined, there are three combination groups that can satisfy the condition (fire prevention on one surface) in which at least one of the first heating side and the second heating side can pass the flame insulating performance test.

That is, the three combination groups are the first combination group (the specimens numbered 2-1 to 2-6 in Table 2) including the combinations of the first glass sheet 2B obtained by forming the heat reflecting coating 4 with an emissivity (E) of 0.07 or less on one surface of a glass sheet that is thermally strengthened (20 MPa or more) more than or equally to a heat strengthened glass sheet and the second glass sheet 2C obtained by thermally strengthening a glass sheet more than or equally to a heat strengthened glass sheet, the second combination group (the specimen numbered 2-7

TABLE 2

| | First glass sheet 2B (with coating) | | Second glass sheet 2C (without coating) | | Results of fire prevention test | |
|---|---|---|---|---|---|---|
| No. | Type of glass | Emissivity (E) | Type of glass | Emissivity (E) | First heating side | Second heating side |
| 2-1 | Heat strengthened | 0.03 | Heat strengthened | 0.95 | Poor | Good |
| 2-2 | Heat strengthened | 0.03 | Tempered | 0.95 | Poor | Good |
| 2-3 | Heat strengthened | 0.03 | Super tempered | 0.95 | Good | Good |
| 2-4 | Heat strengthened | 0.07 | Heat strengthened | 0.95 | Poor | Good |
| 2-5 | Heat strengthened | 0.07 | Tempered | 0.95 | Poor | Good |
| 2-6 | Heat strengthened | 0.07 | Super tempered | 0.95 | Good | Good |
| 2-7 | Heat strengthened | 0.1 | Super tempered | 0.95 | Good | Good |
| 2-8 | Tempered | 0.03 | FL | 0.95 | Good | Good |
| 2-9 | Tempered | 0.07 | FL | 0.95 | Good | Good |
| 2-10 | Tempered | 0.1 | FL | 0.95 | Poor | Good |
| 2-11 | Tempered | 0.15 | FL | 0.95 | Poor | Good |

The above Table 2 shows the results of the ISO 0834 flame insulating performance test (fire prevention test) for a plurality of double glazed glass panels for a fire door including the double glazed glass panel for a fire door according to the present invention. The thickness and the dimensions of the glass sheet included in the specimen is the same as in Table 1.

In the flame insulating performance test, both a test in which the specimen was positioned such that a flame faced the first glass sheet 2B (first heating side) and a test in which the specimen was positioned such that a flame faced the second glass sheet 2C (second heating side) were separately performed.

"Good" in the table shows that the double glazed glass panel passed the ISO 0834 flame insulating performance test, and "Poor" shows that the double glazed glass panel was broken by the heat during the test and did not pass the test.

A combination of the glass sheets in which both the first heating side and the second heating side were able to pass the flame insulating performance test, that is, that had a fire in Table 2) including the combinations of the first glass sheet 2B obtained by forming the heat reflecting coating 4 with an emissivity (E) of 0.1 or less on one surface of a glass sheet that is thermally strengthened more than or equally to a heat strengthened glass sheet and the second glass sheet 2C obtained by thermally strengthening a glass sheet (120 MPa or more) more than or equally to a super tempered glass sheet, and the third combination group (the specimens numbered 2-8 to 2-11 in Table 2) including the combinations of the first glass sheet 2B obtained by forming the heat reflecting coating 4 with an emissivity (E) of 0.15 or less on one surface of a glass sheet that is thermally strengthened (80 MPa or more) more than or equally to a tempered glass sheet and the second glass sheet 2C that is an arbitrary glass sheet including a non-tempered glass sheet (FL).

In the three combination groups, the combinations that also have a fire prevention performance on both the surfaces are the combinations (that is, the specimens 2-8 and 2-9 in Table 2) using the heat reflecting coating 4 with an emissivity (E) of 0.07 or less in the third combination group (that is, the specimens 2-8 to 2-11 in Table 2), and the combinations in which a glass sheet that is thermally strengthened more than or equally to a super tempered glass is used as the second glass sheet 2C in the first and the second combination groups (that is, the specimens 2-3, 2-6, and 2-7 in Table 2).

EXAMPLE 3

<Second Example of Configuration of Double Glazed Glass Panel for a Fire Door>

Figure 3:
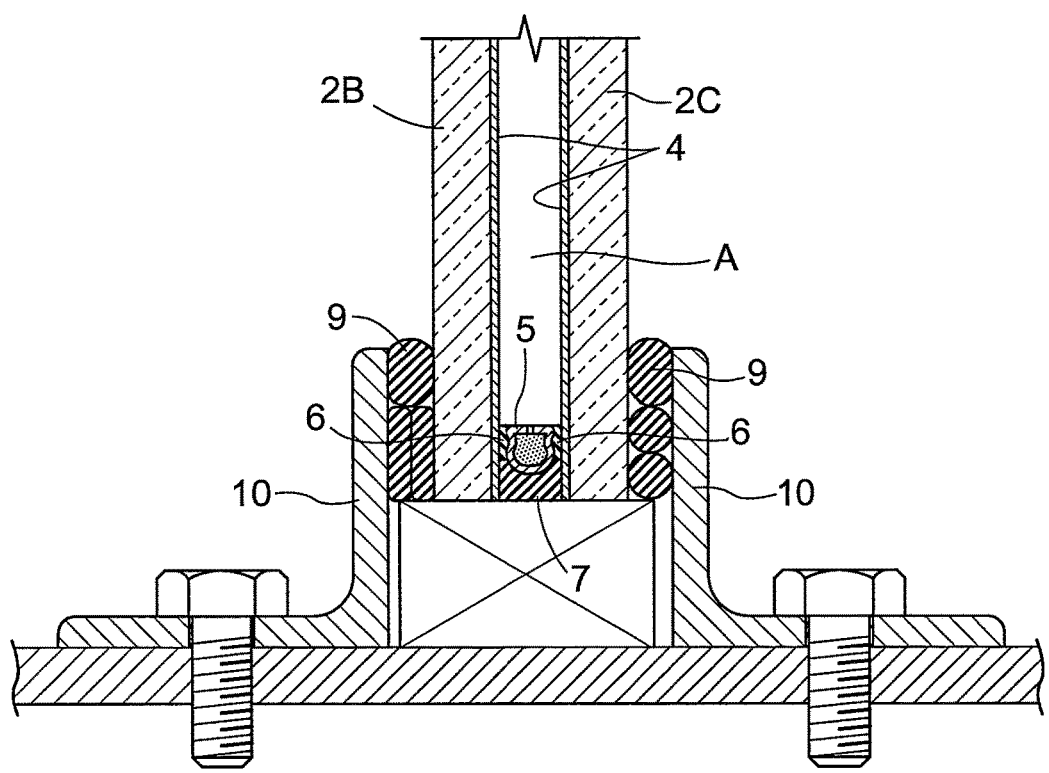
FIG. 3 is a cross-sectional view of another embodiment of a double glazed glass panel for a fire door according to the present invention.

Example 3 shown in FIG. 3 has a substantially similar configuration to that of Example 2 shown in FIG. 2, and differs from Example 2 in that the heat reflecting coatings 4 are formed on both the first glass sheet 2B and the second glass sheet 2C. The heat reflecting coatings 4 are formed on the surfaces of the glass sheet 2B and 2C that face the air layer A.

As shown in following Table 3, both the first glass sheet 2B and the second glass sheet 2C are heat strengthened glass sheets with a surface compressive stress of 20-60 MPa.

A plurality of the emissivities (E) in the range between 0.1 or less and 0.03 or more were examined in the heat reflecting coating 4.

TABLE 3

| | First glass sheet 2B (with coating) | | Second glass sheet 2C (with coating) | | Results of fire prevention test | |
|---|---|---|---|---|---|---|
| No. | Type of glass | Emissivity (E) | Type of glass | Emissivity (E) | First heating side | Second heating side |
| 3-1 | Heat strengthened | 0.03 | Heat strengthened | 0.03 | Good | Good |
| 3-2 | Heat strengthened | 0.07 | Heat strengthened | 0.03 | Good | Good |
| 3-3 | Heat strengthened | 0.07 | Heat strengthened | 0.07 | Good | Good |
| 3-4 | Heat strengthened | 0.03 | Heat strengthened | 0.1 | Poor | Good |
| 3-5 | Heat strengthened | 0.07 | Heat strengthened | 0.1 | Poor | Good |

Table 3 shows that when the two glass sheets 2B and 2C on both of which the heat reflecting coatings 4 are formed are combined, the combinations (the specimens 3-1 to 3-5 in Table 3) in which the emissivity of one of the heat reflecting coating 4 of the first glass sheet 2B and the heat reflecting coating 4 of the second glass sheet 2C is set to 0.07 or less and the emissivity of the other heat reflecting coating 4 is set to 0.1 or less can satisfy the condition in which at least one of the first heating side and the second heating side can pass the flame insulating performance test (fire prevention test).

Moreover, it is found that when the two glass sheets 2B and 2C on both of which the heat reflecting coatings 4 are formed are combined, the combinations (the specimens 3-1 to 3-3 in Table 3) in which the emissivity of one of the heat reflecting coating 4 of the first glass sheet 2B and the heat reflecting coating 4 of the second glass sheet 2C is set to 0.07 or less and the emissivity of the other heat reflecting coating 4 is set to 0.07 or less can satisfy the condition in which the combinations also have a fire prevention performance on both the surfaces.

INDUSTRIAL APPLICABILITY

The present invention can be used for the technique for solving the problems with a conventional single glass panel for a fire door and a double glazed glass panel for a fire door.

REFERENCE SIGNS LIST

2A Glass sheet
2B First glass sheet
2C Second glass sheet
4 Heat reflecting coating
5 Spacer

The invention claimed is:
1. A double glazed glass panel for a fire door, comprising:
a first glass sheet that has two surfaces, at least one of the surfaces being obtained by forming a first heat reflecting coating thereon, and of which a surface compressive stress is 20 MPa or more and less than 80 MPa; and
a second glass sheet that has two surface, at least one of the surfaces being obtained by forming a second heat reflecting coating thereon, and of which a surface compressive stress is 20 MPa or more and less than 80 MPa, wherein
the first glass sheet and the second glass sheet are arranged in parallel to face each other with a gap therebetween such that these surfaces on which the first and second heat reflecting coatings are formed are inside, these surfaces being defined as inner surfaces of the first and second glass sheets,
emissivities of the first and second heat reflecting coatings are set to be 0.07 or less, and
each of the first and second heat reflecting coatings is formed with at least two layers of silver, which are defined as a lower Ag layer and an upper Ag layer,
the lower Ag layer is directly deposited on the inner surface of each of the first and second glass sheets such that no layer intervenes between the lower Ag layer and the inner surface,
under a condition where a test flame is placed at either side of the first glass sheet or the second glass sheet, the double glazed glass panel satisfies the ISO 0834 flame insulating performance test.
2. The double glazed glass panel for the fire door according to claim 1, wherein the surface compressive stress of the first glass sheet and the surface compressive stress of the second glass sheet are both less than 60 MPa.

3. The double glazed glass panel for the fire door according to claim 2, wherein
the emissivities of the first and second heat reflecting coatings are 0.03 or more.

4. The double glazed glass panel for the fire door according to claim 3, wherein
no heat reflecting coating is formed on the other surface of the first glass sheet, which is opposite to the one of the surfaces on which the first heat reflecting coating is formed, and
no heat reflecting coating is formed on the other surface of the second glass sheet, which is opposite to the one of the surfaces on which the second heat reflecting coating is formed.

5. The double glazed glass panel for the fire door according to claim 1, further comprising:
a spacer that has a predetermined width, wherein
the spacer is sandwiched between the first and second glass sheets, surrounding edges of the first and second glass sheets, and being sealed to the first and second glass sheets such that a sealed air layer is formed inside the spacer, and
when thicknesses of the first glass sheet, the air layer and the second glass sheet are respectively represented with T1, A1, T2, these thicknesses (T1, A1, T2) satisfy follow:

T1:A1:T2=1:2 or more:1.

6. The double glazed glass panel for the fire door according to claim 5, wherein
the thickness of the air layer is ranged between 6 mm and 12 mm.

7. The double glazed glass panel for the fire door according to claim 5, wherein
the surface compressive stress of the first glass sheet and the surface compressive stress of the second glass sheet are both less than 60 MPa.

8. The double glazed glass panel for the fire door according to claim 5, wherein
the other of the first and second heat reflecting coatings has the emissivity that is set to be 0.07 or less, and
the first and second heat reflecting coatings are both formed with two or more layers of silver.

9. The double glazed glass panel for the fire door according to claim 8, wherein
the thickness of the air layer is ranged between 6 mm and 12 mm.

10. The double glazed glass panel for the fire door according to claim 9, wherein
the surface compressive stress of the first glass sheet and the surface compressive stress of the second glass sheet are both less than 60 MPa.

11. The double glazed glass panel for the fire door according to claim 10, wherein
the emissivities of the first and second heat reflecting coatings are 0.03 or more.

12. The double glazed glass panel for the fire door according to claim 10, wherein
no heat reflecting coating is formed on the other surface of the first glass sheet, which is opposite to the one of the surfaces on which the first heat reflecting coating is formed, and
no heat reflecting coating is formed on the other surface of the second glass sheet, which is opposite to the one of the surfaces on which the second heat reflecting coating is formed.

13. The double glazed glass panel for the fire door according to claim 1, wherein
the upper Ag layer is directly deposited on the lower Ag layer of each of the first and second glass sheets such that no layer intervenes between the upper Ag layer and the lower Ag layer.

14. The double glazed glass panel for the fire door according to claim 13, further comprising:
a spacer that has a predetermined width, wherein
the spacer is sandwiched between the first and second glass sheets, surrounding edges of the first and second glass sheets, and being sealed to the first and second glass sheets such that a sealed air layer is formed inside the spacer, and
when thicknesses of the first glass sheet, the air layer and the second glass sheet are respectively represented with T1, A1, T2, these thicknesses (T1, A1, T2) satisfy follow:

T1:A1:T2=1:2 or more:1.

* * * * *